United States Patent [19]

Layotte

[11] Patent Number: 4,776,425
[45] Date of Patent: Oct. 11, 1988

[54] METHOD FOR IMPROVING COUPLING WITH THE GROUND OF LAND BASED SEISMIC SOURCES

[75] Inventor: Sierre C. Layotte, Les Mathes, France

[73] Assignee: Institut Francais du Petrole, Rueil-Malmaison, France

[21] Appl. No.: 833,265

[22] Filed: Feb. 27, 1986

[30] Foreign Application Priority Data

Feb. 28, 1985 [FR] France ............................ 85 02924

[51] Int. Cl.⁴ .......................................... G10K 11/00
[52] U.S. Cl. .................................. 181/0.5; 181/401; 73/644
[58] Field of Search ............... 181/401, 400, 402, 0.5, 181/113, 114, 121, 142, 139, 140; 367/189-191, 155; 73/644; 166/302, 250, 249, 308, 901; 405/56, 79, 130, 217; 310/341; 128/DIG. 27

[56] References Cited

U.S. PATENT DOCUMENTS

| | | | |
|---|---|---|---|
| 3,489,240 | 1/1970 | Griffith et al. | 181/401 |
| 3,625,051 | 9/1969 | Uozumi | 73/644 X |
| 3,943,722 | 3/1976 | Ross | 405/130 |
| 4,020,919 | 5/1977 | Broding | 181/401 X |
| 4,125,159 | 11/1978 | Vann | 166/302 X |
| 4,567,770 | 2/1986 | Rumbold et al. | 73/644 |
| 4,597,444 | 7/1986 | Hutchinson | 405/130 |
| 4,676,694 | 6/1987 | Karinthi et al. | 405/130 |

FOREIGN PATENT DOCUMENTS 0564423 7/1977 U.S.S.R. ............................ 405/130

Primary Examiner—Brian S. Steinberger
Attorney, Agent, or Firm—Antonelli, Terry & Wands

[57] ABSTRACT

A process for improving the coupling of seismic sources with the ground by temporary consolidation thereof, consisting essentially in boring one or more injection holes in the vicinity of the successive locations of a seismic profile where it is desired to trigger off a seismic source and injecting into these holes a freezing fluid which freezes the ground and increases its resistance to compression and shearing. The method in particular minimizes the coupling losses at relatively high frequencies.

8 Claims, 1 Drawing Sheet

METHOD FOR IMPROVING COUPLING WITH THE GROUND OF LAND BASED SEISMIC SOURCES

BACKGROUND OF THE INVENTION

1. Field of the Invention

The invention relates to a method for improving the coupling of land based seismic sources with the ground.

2. Description of the Prior Art

Land based sources generally comprise means for creating oscillating or pulsed forces and means for applying the forces thus created to the ground. Among known sources may be mentioned for example those which comprise a target element coupled with the ground, a mass adapted for falling in the direction of the impact surfaces of the target elements and means for raising the mass and guiding its fall in the direction of the impact surfaces.

The mass may be guided by a vertically disposed rectilinear guide element towards an impact face parallel to the surface of the ground, so as to produce P waves or longitudinal waves. A device operating according to this principle is described in the published French patent application No. 2 398 316.

The mass may also be guided in its fall by cables or a pivoting arm towards a lateral impact face of a target element coupled with the ground so as to produce transverse or shear waves (S waves) Such a device is described for example in French patent No. 2 76 599.

A known process for improving the coupling of a seismic source consists in fixing serrated or pointed coupling elements under the target element. The penetration of these elements into the ground, facilitated, if for example a part of the weight of the vehicle is caused to weigh on the targe element disposed at a chosen "firing" point, contributes to increasing the coupling coefficient of the seismic source.

Another known process which may be possibly associated with the preceding one consists in isolating the lower face of the target element by means of a peripheral skirt and in placing said face in a position of application on the ground by means of a vacuum pump, such as described in the certificate of addition No. 2 424 402 to the above mentioned French patent No. 2 276 599.

The known processes very substantially increase the coupling coefficient of the seismic sources of the ground and, consequently, their energy efficiency. However, as will be seen in greater detail in the description, known processes do not allow a good homogeneity to be obtained in transmitting to the ground all the frequencies of the frequency spectrum emitted during firing.

The coupling process of the invention enlarges in appreciable proportions the frequency spectrum of the seismic waves effectively transmitted to the ground.

SUMMARY OF THE INVENTION

The process consists in locally lowering the temperature of the ground below the surface of application to the ground of the seismic waves created by triggering the sources. The temperature of the ground is locally lowered advantageously by injection of freezing substances.

BRIEF DESCRIPTION OF THE DRAWINGS

Other features and advantages will be clear from reading the following description of embodiments given by way of non limitative examples with reference to the accompanying drawings in which.

DESCRIPTION OF THE PREFERRED EMBODIMENT

The law of variation of the modulus of the spectrum of the energy transmitted by a given seismic source into the ground, considering this latter as a visco-elastic medium, may be likened to a law of the parabolic type:

$$S(f) = -bf^2$$

where b is a coefficient of proportionality dependent on the source of acoustic waves used, on the ground and on the operating conditions. The modulus of the spectrum of the transmitted energy is maximum for frequencies less than a few tens of hertz and decreases rapidly for the higher frequencies. Depending on the case, the attenuation factor at 100 Hz may vary from 10 to 30 dB and even more. The result is that the resolution power of the landbased seismic sources which is related to the width of the band of frequencies which they are capable of transmitting to the ground, is relatively low.

With the process of the invention, the coupling coefficient of land based seismic sources may be increased and the width of their emission spectrum, consequently their power of resolution, may be improved in appreciable proportions.

With the position of the locations for triggering the source used being previously fixed, a freezing substance, such as liquid nitrogen for example, is injected into the ground so as to freeze a certain zone about each of said locations to a given depth. The area of such a zone depends on the shape and on the area of the coupling element by means of which the acoustic waves are applied to the ground.

In the case of the vertically directed impact source described in the French patent application No. 2 398 316 already mentioned in which the coupling element is the circular plate of a target element placed on the ground, a freezing substance is injected so as to obtain a frozen zone of cylindrical symmetry centered on the axis of the target element.

Figure 1:
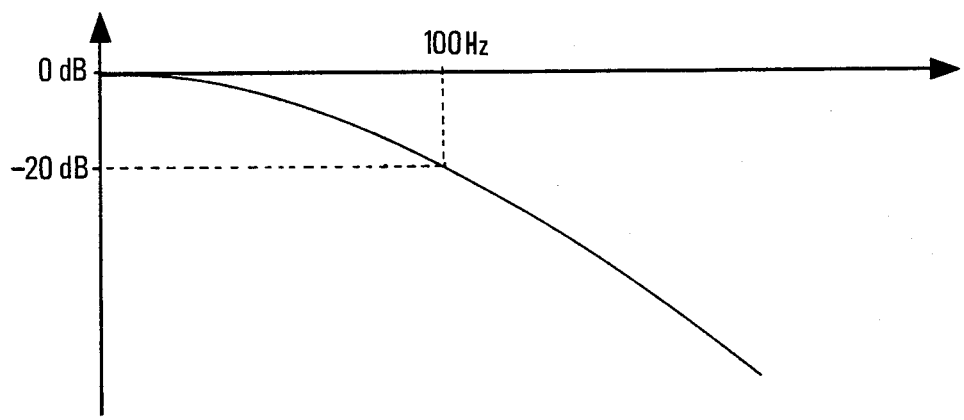
FIG. 1 shows the general trend, after smoothing, of the frequency spectrum of the seismic waves transmitted to the ground, using a conventional coupling process comprising the application of a bearing force for improving the anchorage of a seismic source.
Figure 2:
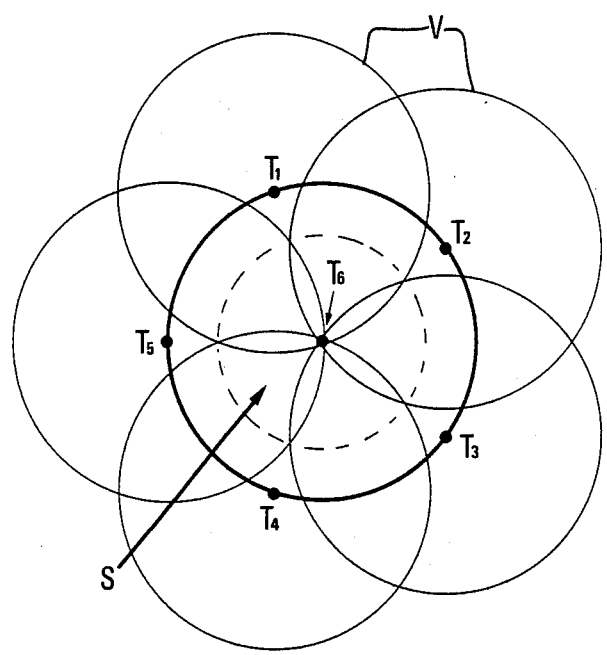
FIG. 2 shows an arrangement of points for injecting into the ground a freezing fluid.

In a first embodiment (FIG. 2), several holes are pierced at the periphery of the location S where it is desired to place the base plate of the coupling element or the target element of the source used, and a certain amount of freezing liquid is injected therein by means of an appropriate injection pipe. The amount of liquid introduced into the holes is sufficient for the different volumes V of the ground centered thereabout to intersect so that a total volume is obtained frozen homogeneously. To increase the freezing effect at location S of the coupling element of the seismic source, a hole may so be pierced at its center and freezing product injected therein. In the example shown, six holes $T_1$ to $T_6$ are bored in the center and at the periphery of each location S. Their diameter is of a few centimeters and their depth varies for example between 60 cm and 120 cm.

In another embodiment simplifying the step for preparing the "firing" locations, the ground volume below the coupling element or below the target element of the source may also be frozen by boring a single injection hole such as $T_6$ in the center of each location S.

The time required after the freezing liquid injections so as to obtain a sufficiently frozen ground zone depends on the number of injection holes and on the amount of freezing products injected, on the nature of the ground, on the temperature etc. Humidity has an essential influence in improving the transmission coefficient because the ice which is formed through the action of the freezing products welds the ground particles together and increases the resistance of the ground to compression and shearing.

The influence of the different parameters affecting the freezing speed may be determined experimentally so as to optimize the waiting time and the transmission coefficient of the frozen ground. The injection of freezing liquid is carried out for example, depending on the cases, between 12 hours and 24 hours before the "firing" times at the frozen locations.

Application of the process of the invention increases very substantially the transmission coefficient of the ground for relatively high frequencies and thus allows a more homogeneous emission spectrum to be obtained.

A secondary but very important advantage of the process is the temporary character of the consolidation provided by freezing. When the ground which was frozen has come back to its first temperature, it may be restored to its normal use. The organization of prospection campaigns in agricultural regions or urban areas is thus facilitated.

What is claimed is:

1. A method for improving the coupling of a seismic source with the ground which comprises locally injecting a freezing substance into the ground in adequate quantity to have the ground locally frozen and locating a seismic source against the locally frozen ground, thereby increasing transmission factor of the ground for the seismic waves emitted by said seismic source.

2. The method of claim 1, wherein the freezing substance comprises liquid nitrogen.

3. The methof of claim 1, wherein a zone about the surface of the ground to which the sound waves are applied is frozen by injecting the liquid nitrogen into a plurality of bore holes in the ground located peripherally around said zone.

4. The method of claim 1, wherein a zone underneath said surface of the ground to which the seismic waves are applied is frozen by injecting the liquid nitrogen into a central part of said zone.

5. A method for improving the coupling of a seismic source with the ground and for effecting seismic prospecting thereof, which comprises locally injecting a freezing substance into the ground in adequate quantity to have the ground locally frozen, locating a seismic source against the locally frozen ground and triggering the seismic source to generate seismic waves into the ground with an improved transmission factor.

6. A method according to claim 5, wherein the freezing substance comprises liquid nitrogen.

7. A method according to claim 5, wherein a zone about a surface of the ground to which the seismic waves are applied is frozen by injecting the liquid nitrogen into a plurality of bore holes in the ground located peripherally about said zone.

8. The method of claim 5, wherein a zone underneath said surface of the ground to which the seismic waves are applied is frozen by injecting the liquid nitrogen into a central part of said zone.

* * * * *